United States Patent
Farley et al.

(10) Patent No.: US 9,847,802 B1
(45) Date of Patent: Dec. 19, 2017

(54) RECONFIGURATION OF SINGLE-BAND TRANSMIT AND RECEIVE PATHS TO MULTI-BAND TRANSMIT AND RECEIVE PATHS IN AN INTEGRATED CIRCUIT

(71) Applicant: Xilinx, Inc., San Jose, CA (US)

(72) Inventors: Brendan Farley, Donabate (IE); John E. McGrath, Cahir (IE)

(73) Assignee: XILINX, INC., San Jose, CA (US)

( * ) Notice: Subject to any disclaimer, the term of this patent is extended or adjusted under 35 U.S.C. 154(b) by 20 days.

(21) Appl. No.: 15/238,537

(22) Filed: Aug. 16, 2016

(51) Int. Cl.
| | | |
|---|---|---|
| *H04K 1/10* | (2006.01) | |
| *H04L 27/28* | (2006.01) | |
| *H04B 1/04* | (2006.01) | |
| *H04B 1/16* | (2006.01) | |

(52) U.S. Cl.
CPC ............. *H04B 1/0483* (2013.01); *H04B 1/16* (2013.01)

(58) Field of Classification Search
CPC ........ H04B 1/123; H04B 7/002; H04B 1/109; H04B 1/04; H04B 7/0408; H04B 7/0617; H04B 7/0691; H04B 7/0413; H04B 7/0695; H04B 7/088; H04L 1/06; H04L 25/0204; H04L 27/04; H03K 3/78; G01S 1/02; G01S 7/282; H04W 4/00
USPC .................................. 375/259–285, 295–352
See application file for complete search history.

(56) References Cited

U.S. PATENT DOCUMENTS

| | | | | |
|---|---|---|---|---|
| 6,128,355 A | * | 10/2000 | Backman ............. | H04B 7/0845 375/347 |
| 7,277,679 B1 | * | 10/2007 | Barratt ................... | H04B 7/084 375/347 |
| 7,636,554 B2 | * | 12/2009 | Sugar ..................... | H04B 1/005 455/272 |
| 7,680,461 B2 | * | 3/2010 | Takano ................ | H04B 7/0615 370/328 |
| 7,733,949 B2 | * | 6/2010 | Jin ........................ | H04B 17/354 375/221 |
| 7,894,507 B2 | * | 2/2011 | Kent ................... | H04L 25/0204 375/144 |
| 7,903,775 B2 | * | 3/2011 | Ku ........................ | H04L 7/0012 375/220 |
| 8,000,401 B2 | * | 8/2011 | Lee ....................... | H04B 7/0456 370/203 |
| 8,000,421 B2 | * | 8/2011 | Takano .................... | H04B 7/02 375/260 |
| 8,189,646 B2 | * | 5/2012 | Ries ........................ | G01S 19/02 375/140 |

(Continued)

*Primary Examiner* — James M Perez
(74) *Attorney, Agent, or Firm* — Robert M. Brush

(57) ABSTRACT

An example transmitter includes first and second circuit stages and interface circuits. The first circuit stage is configured to generate modulated signals each having a different carrier frequency from baseband signals. The second circuit stage is configured to generate radio frequency (RF) energy to be radiated by antenna(s). The interface circuits are coupled between the first circuit stage and the second circuit stage. The second circuit stage and the interface circuits are configurable to provide a first mode and a second mode. In the first mode, the second circuit stage provides transmit paths and the interface circuits couple each of the modulated signals to a respective one of the transmit paths. In the second mode, the second circuit stage provides a first transmit path and the interface circuits couple a sum of at least two of the modulated signals to the first transmit path.

19 Claims, 10 Drawing Sheets

(56) References Cited

U.S. PATENT DOCUMENTS

| | | | | |
|---|---|---|---|---|
| 8,189,649 B2* | 5/2012 | Yuda | H04B 7/0619 | 375/219 |
| 8,223,904 B2* | 7/2012 | Sampath | H04B 7/0817 | 375/232 |
| 8,391,322 B2* | 3/2013 | Kent | H04B 7/0842 | 370/335 |
| 8,498,362 B2* | 7/2013 | Zhang | H04B 7/0417 | 375/267 |
| 8,520,784 B1* | 8/2013 | Lackey | H04B 7/0619 | 375/284 |
| 8,649,418 B1* | 2/2014 | Negus | H04B 7/0486 | 375/211 |
| 8,665,938 B2* | 3/2014 | Yu | H04W 24/10 | 375/220 |
| 8,699,405 B2* | 4/2014 | Yamaura | H04B 7/0417 | 370/277 |
| 8,699,607 B2* | 4/2014 | Seller | H04L 1/04 | 375/256 |
| 8,767,860 B2* | 7/2014 | Catreux | H04B 7/0615 | 375/260 |
| 8,769,231 B1* | 7/2014 | Ansari | G06F 3/0659 | 710/317 |
| 8,917,759 B2* | 12/2014 | Xu | H04L 27/2272 | 375/214 |
| 8,917,796 B1* | 12/2014 | Mayrench | H04L 5/0028 | 375/260 |
| 8,995,594 B2* | 3/2015 | Kesling | H04B 1/38 | 375/220 |
| 9,002,299 B2* | 4/2015 | Perahia | H04L 25/022 | 370/334 |
| 9,008,156 B1* | 4/2015 | Dick | H03F 1/3247 | 375/211 |
| 9,130,706 B2* | 9/2015 | Grant | H04B 7/061 | |
| 9,300,510 B2* | 3/2016 | You | H04L 1/0071 | |
| 9,325,554 B2* | 4/2016 | Yokokawa | H04L 25/0232 | |
| 9,374,141 B2* | 6/2016 | Murakami | H04B 7/04 | |
| 9,432,036 B1* | 8/2016 | Lowney | H03K 17/04106 | |
| 2004/0121753 A1* | 6/2004 | Sugar | H04B 1/005 | 455/333 |
| 2004/0192218 A1* | 9/2004 | Oprea | H04L 25/03343 | 455/73 |
| 2005/0128993 A1* | 6/2005 | Yu | H04B 7/061 | 370/342 |
| 2005/0195889 A1* | 9/2005 | Grant | H04B 1/707 | 375/148 |
| 2005/0249319 A1* | 11/2005 | Suh | H04L 25/0228 | 375/347 |
| 2006/0072607 A1* | 4/2006 | Kent | H04B 7/0848 | 370/464 |
| 2006/0072652 A1* | 4/2006 | Kent | H04B 1/707 | 375/148 |
| 2006/0072691 A1* | 4/2006 | Kent | H04L 25/0204 | 375/349 |
| 2006/0193396 A1* | 8/2006 | Li | H04L 1/02 | 375/267 |
| 2006/0285479 A1* | 12/2006 | Han | H04B 7/0678 | 370/203 |
| 2007/0110135 A1* | 5/2007 | Guess | H04L 1/0048 | 375/148 |
| 2007/0140102 A1* | 6/2007 | Oh | H04B 7/061 | 370/208 |
| 2007/0223563 A1* | 9/2007 | Perlow | H04L 25/0224 | 375/130 |
| 2007/0260958 A1* | 11/2007 | Li | H04L 1/0048 | 714/755 |
| 2008/0056402 A1* | 3/2008 | Jang | H04B 7/061 | 375/267 |
| 2008/0144749 A1* | 6/2008 | Wilhelmsson | H04L 27/2647 | 375/346 |
| 2008/0227422 A1* | 9/2008 | Hwang | H04B 7/0452 | 455/278.1 |
| 2008/0240031 A1* | 10/2008 | Nassiri-Toussi | H04B 7/0408 | 370/329 |
| 2008/0247364 A1* | 10/2008 | Kim | H04B 7/0671 | 370/336 |
| 2009/0175374 A1* | 7/2009 | Seki | H04B 7/02 | 375/260 |
| 2009/0180466 A1* | 7/2009 | Soul | H03J 7/04 | 370/350 |
| 2009/0232244 A1* | 9/2009 | Kawasaki | H04B 7/08 | 375/267 |
| 2009/0316807 A1* | 12/2009 | Kim | H04B 7/061 | 375/260 |
| 2010/0099366 A1* | 4/2010 | Sugar | H04B 1/005 | 455/75 |
| 2010/0195752 A1* | 8/2010 | Lee | H04J 11/004 | 375/267 |
| 2010/0310022 A1* | 12/2010 | Asjadi | H04L 27/2605 | 375/343 |
| 2011/0028106 A1* | 2/2011 | Lee | H04B 7/061 | 455/101 |
| 2011/0081935 A1* | 4/2011 | Yeon | H04W 52/346 | 455/522 |
| 2011/0135036 A1* | 6/2011 | Andgart | H04L 27/2647 | 375/316 |
| 2012/0236955 A1* | 9/2012 | Zhou | H04B 7/0802 | 375/267 |
| 2012/0287887 A1* | 11/2012 | Jung | H04B 7/0413 | 370/329 |
| 2012/0320818 A1* | 12/2012 | Yang | H04L 5/001 | 370/315 |
| 2013/0051496 A1* | 2/2013 | Li | H04B 1/28 | 375/334 |
| 2013/0114468 A1* | 5/2013 | Hui | H01Q 3/2611 | 370/277 |
| 2013/0121342 A1* | 5/2013 | Kim | H04B 7/0408 | 370/436 |
| 2013/0222183 A1* | 8/2013 | Lin | H01Q 3/42 | 342/372 |
| 2013/0266085 A1* | 10/2013 | Sesia | H04B 7/0413 | 375/295 |
| 2013/0322309 A1* | 12/2013 | Smith | H04L 5/001 | 370/281 |
| 2013/0322373 A1* | 12/2013 | Jeon | H04W 72/0406 | 370/329 |
| 2014/0269964 A1* | 9/2014 | Du | H04B 7/0452 | 375/267 |
| 2014/0294111 A1* | 10/2014 | Zhang | H04B 7/0417 | 375/267 |
| 2015/0002326 A1* | 1/2015 | Farley | H03M 1/002 | 341/155 |
| 2015/0229383 A1* | 8/2015 | Chen | H04B 7/0885 | 370/329 |
| 2015/0312919 A1* | 10/2015 | Lee | H04B 7/0473 | 370/252 |
| 2017/0097910 A1* | 4/2017 | Kumar A V | G06F 13/28 | |

\* cited by examiner

_US 9,847,802 B1_

RECONFIGURATION OF SINGLE-BAND TRANSMIT AND RECEIVE PATHS TO MULTI-BAND TRANSMIT AND RECEIVE PATHS IN AN INTEGRATED CIRCUIT

TECHNICAL FIELD

Examples of the present disclosure generally relate to electronic circuits and, in particular, to reconfiguration of single-band transmit and receive paths to multi-band transmit and receive paths in an integrated circuit.

BACKGROUND

Current remote radio head (RRH) architectures typically support single-band transmit and receive paths to each antenna. In order to reduce system cost, there is market pressure to concurrently transmit multiple bands through the same antenna ("multi-band" transmission and reception). Multi-band support is typically implemented using dedicated digital signal processor (DSP) circuitry within a given transmit/receive path. However, there are a myriad of single and multi-band deployment requirements. The use of dedicated DSP circuitry leads to a lack of flexibility and an increase in cost overhead when attempting to support all of the deployment requirements.

SUMMARY

Techniques for reconfiguration of single-band transmit and receive paths to multi-band transmit and receive paths in an integrated circuit (IC) are described. In an example, a transmitter includes first and second circuit stages and interface circuits. The first circuit stage is configured to generate modulated signals from baseband signals, each of the modulated signals comprising a digital signal having respective a carrier frequency of a plurality of carrier frequencies. The second circuit stage is configured to generate radio frequency (RF) energy to be radiated by one or more antennas. The interface circuits are coupled between the first circuit stage and the second circuit stage. The second circuit stage and the interface circuits are configurable to provide a first mode and a second mode. In the first mode, the second circuit stage provides a plurality of transmit paths and the interface circuits couple each of the modulated signals to a respective one of the plurality of transmit paths. In the second mode, the second circuit stage provides a first transmit path and the interface circuits couple a sum of at least two of the modulated signals to the first transmit path.

In another example, a receiver includes a first circuit stage, a second circuit stage, and interface circuits. The first circuit stage is configured to receive radio frequency (RF) energy from one or more antennas. The second circuit stage includes a plurality of demodulation paths each comprising a digital demodulator configured to process a respective frequency of a plurality of frequencies. The interface circuits are coupled between the first circuit stage and the second circuit stage. The first circuit stage and the interface circuits are configurable to provide a first mode and a second mode. In the first mode, the first circuit stage generates a plurality of digital signals from the RF energy and the interface circuits couple each of the plurality of digital signals to a respective one of the plurality of demodulation paths. In the second mode, the first circuit stage generates a first digital signal from the RF energy and the interface circuits couple the first digital signal to at least two of the plurality of demodulation paths.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
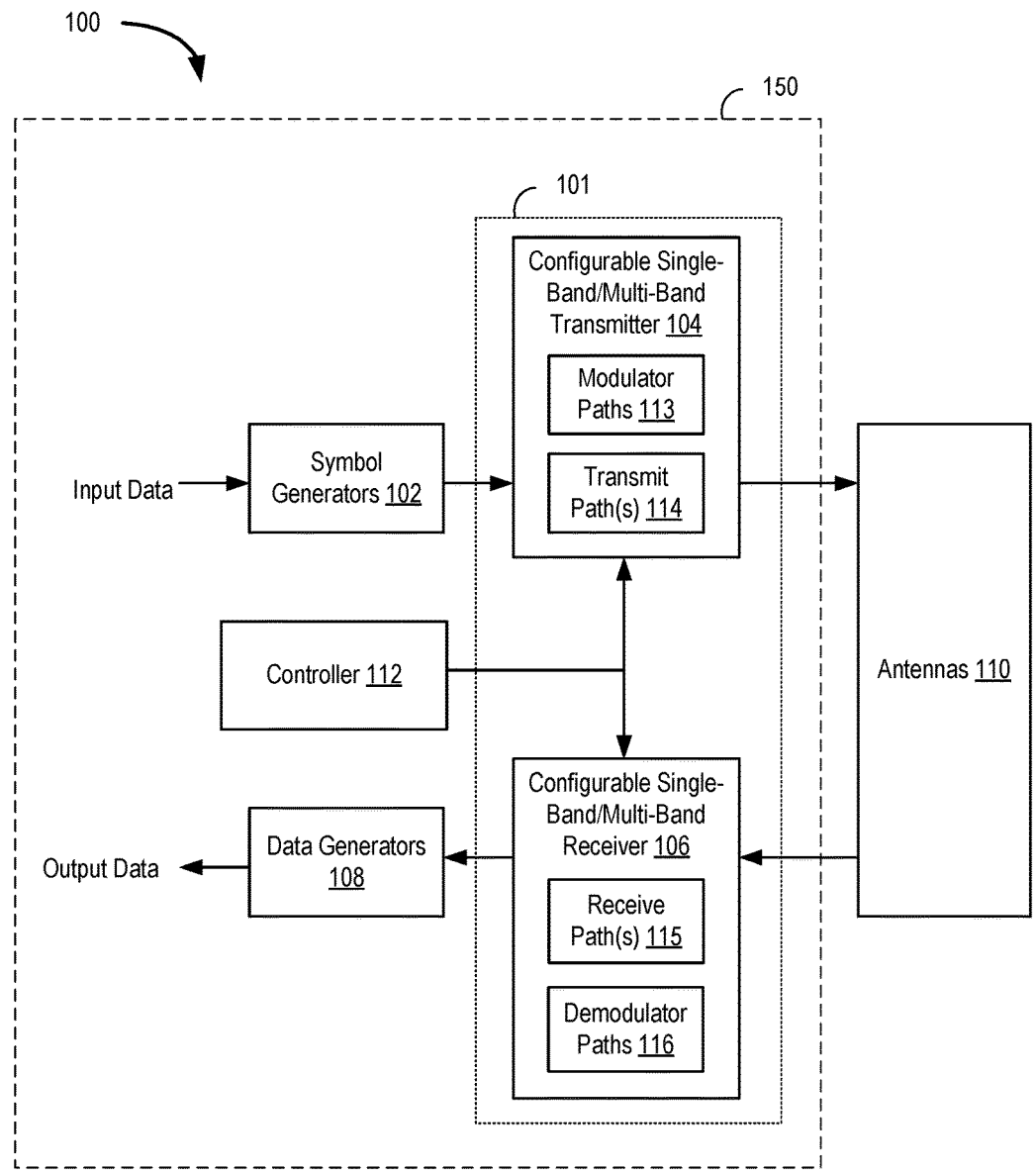
FIG. 1 is a block diagram depicting a communication system according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

FIG. 1 is a block diagram depicting a communication system 100 according to an example. The communication system 100 includes symbol generators 102, data generators 108, a transceiver 101, and antennas 110. The communication system 100 can also include a controller 112 configured to control the transceiver 101. The symbol generators 102, the data generators 108, the controller 112, and the transceiver 101 can be part of an integrated circuit (IC) 150. The antennas 110 can be coupled to the IC 150 by external transmission lines (not shown).

The transceiver 101 includes a configurable single-band/multi-band transmitter 104 (briefly referred to as "transmitter 104") and a configurable single-band/multi-band receiver 106 (briefly referred to as "receiver 106"). Inputs of the symbol generators 102 receive input data to be transmitted. Outputs of the symbol generators 102 are coupled to inputs of the transmitter 104. Outputs of the transmitter 104 are coupled to the antennas 110. Inputs of the receiver 106 are coupled to the antennas 110. Outputs of the receiver 106 are coupled to inputs of the data generator 108. Outputs of the data generator 108 provide output data. An output of the controller 112 is coupled to control inputs of the transmitter 104 and the receiver 106, respectively.

In operation, the symbol generators 102 generate baseband signals from the input data. The input data comprise data bits. The symbol generators 102 map the data bits of the input data into two-dimensional symbols in a modulation alphabet of a particular digital modulation scheme. Various digital modulation schemes can be employed. For example, a 16-level quadrature amplitude modulation (QAM) scheme includes an alphabet (also referred to as a constellation) of 16 symbols, where each symbol represents four data bits of the input data. Each two-dimensional symbol is represented by an in-phase (I) coordinate and a quadrature-phase (Q) coordinate. For quadrature modulation schemes, such as QAM, quadrature phase shift keying (QPSK), and the like, the symbol generator 102 generates I and Q components for each symbol.

For single-phase modulation schemes, such as amplitude shift keying (ASK), the symbol generator 102 generates I components for each symbol (the Q components are zero). In general, the symbol generators 102 generate baseband signals, which can include I baseband signals having I symbol components or both I and Q baseband signals having both I and Q symbol components, respectively.

Each baseband signal is a digital signal. As used herein, a digital signal is a sequence of k-bit codes, where k is a positive integer greater than zero. For example, each code represents a value of an I or Q component of a symbol. The number of codes per unit interval is the code-rate (sample rate). A digital signal can also be conceptually viewed as a discrete time, discrete-amplitude signal, where the amplitude of the signal at each discrete time is selected from $2^k$ discrete values.

The transmitter 104 generates one or more radio frequency (RF) analog signals in response to the baseband signals output by the symbol generators 102. An analog signal is a continuous-time, continuous-amplitude signal. The transmitter 104 includes a plurality of modulator paths 113 and is configurable to include one or more transmit paths 114. Each of the transmit paths 114 is coupled to an antenna 110. In a first mode ("single-band mode"), the transmitter 104 is configured to include a plurality of transmit paths 114. The modulator paths 113 generate modulated signals from the baseband signals, and each of the transmit paths 114 outputs an RF analog signal generated from a modulated signal and having a single RF frequency band. In single-band mode, the transmitter 104 outputs a plurality of RF analog signals each having a different RF frequency band for radiation by the antennas 110.

In a second mode ("multi-band mode"), the modulator paths 113 generate modulated signals from the baseband signals, and each of one or more transmit paths 114 receives a sum of at least two of the modulated signals. In multi-band mode, each transmit path 114 outputs an RF analog signal generated by combining multiple frequency bands of multiple modulated signals. The transmitter 104 outputs one or more RF analog signals for radiation by the antennas 110. The transmitter 104 can include a plurality of multi-band modes, as discussed further below. The mode of the transmitter 104 is selected by the controller 112.

The receiver 106 generates baseband signals from RF energy received by the antennas 110. The receiver 106 includes a plurality of demodulator paths 116 and is configurable to include one or more receive paths 115. Each of the receive paths 115 is coupled to an antenna 110. Each of the demodulator paths 116 demodulates a different carrier frequency. In a first mode ("single-band mode"), the receiver 106 is configured to include a plurality of receive paths 115. The receive paths 115 generate digital signals from the RF energy received by the antennas 110, and each demodulator path 116 outputs baseband signals generated from a respective one of the digital signals. In a second mode ("multi-band mode"), the receiver 106 is configured to include one or more receive paths 115. Each receive path 115 generates a digital signal from the RF energy received by an antenna 110. A digital signal generated by one receive path 115 is then coupled to at least two of the demodulator paths 116. Thus, multiple demodulator paths 116 share each receive path 115. The receiver 106 can include a plurality of multi-band modes, as discussed further below. The mode of the receiver 106 is selected by the controller 112.

The data generators 108 generate output data from baseband signals output by the receiver 106. The data generators 108 map symbols of the baseband signals to bits of the output data based on the modulation alphabet of the particular digital modulation scheme used to transmit the data. The data generators 108 performs the reverse process of the symbol generators 102.

The transmitter 104 enables two or more single-band transmit paths to be dynamically reconfigured to support multi-band transmission. Multi-band transmission is achieved by multiplexing and adding inputs to the transmit paths. The transmitter 104 does not require dedicated multi-band digital signal processor (DSP) circuitry to achieve multi-band support. Likewise, the receiver 106 enables two or more single-band receive paths to be dynamically reconfigured to support multi-band reception. Multi-band reception is achieved by multiplexing outputs of the receive paths. The receiver 106 does not require dedicated DSP circuitry to achieve multi-band support. Thus, the transceiver 101 provides flexibility to support single-band or multi-band transmission and reception for multiple radio architectures with low overhead.

Figure 2:
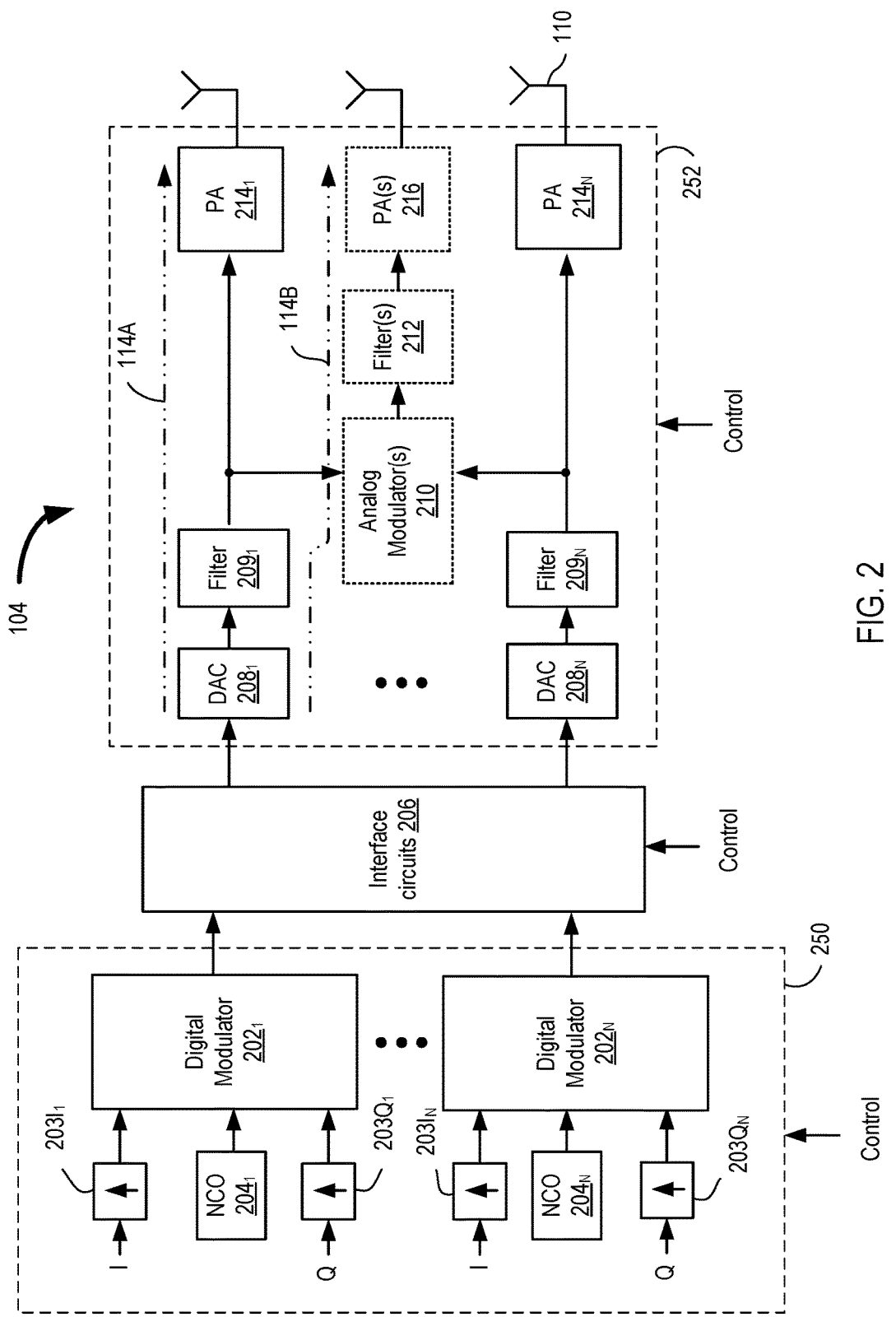
FIG. 2 is a block diagram depicting a transmitter according to an example.

FIG. 2 is a block diagram depicting the transmitter 104 according to an example. The transmitter 104 includes a first circuit stage 250, interface circuits 206, and a second circuit stage 252. Inputs of the first circuit stage 250 receive baseband signals to be transmitted. Outputs of the first circuit stage 250 are coupled to inputs of the interface circuits 206. The outputs of the first circuit stage 250 provide modulated signals. In general, the modulated signals include digital carrier signals modulated by the baseband signals. Outputs of the interface circuits 206 are coupled to inputs of the second circuit stage 252. The interface circuits 206 selectively couple the modulated signals to the transmit paths 114 implemented by the second circuit stage 252. Outputs of the second circuit stage 252 are coupled to antennas 110. In operation, output(s) of the second circuit stage 252 provide RF analog signal(s) to be radiated by antenna(s) 110.

In an example, the first circuit stage 250 includes a plurality of interpolators 203, digital modulators 202, and numerically controlled oscillators (NCOs) 204. Inputs of the interpolators 203 receive the baseband signals. Outputs of the interpolators 203 are coupled to inputs of the digital modulators 202. Local oscillator (LO) inputs of the digital modulators 202 are coupled to outputs of the NCOs 204. Outputs of the digital modulators 202 are coupled to inputs of the interface circuits 206. Each of the modulator paths 113 comprises one of the digital modulators 202. In the example of FIG. 2, the first circuit stage 250 includes N digital modulators $202_1$ through $202_N$, where N is an integer greater than one. Thus, the transmitter 104 includes N modulator paths 113. The interpolators 203 include in-phase interpolators $203I_1$ through $203I_N$ and quadrature interpolators $203Q_1$ through $203Q_N$. The interpolators $203I_1$ and $203Q_1$ are coupled to the digital modulator $202_1$ and the interpolators $203I_N$ and $203Q_N$ are coupled to the digital modulator $203_N$. The NCOs 204 include NCOs $204_1$ through $204_N$. Each of the NCOs $204_1$ through $204_N$ is coupled to a respective one of the digital modulators $202_1$ through $202_N$.

In operation, the interpolators 203 receive the baseband signals having a particular sample rate. The interpolators 203 interpolate the baseband signals to increase the sample rate for processing by the digital modulators 202. The digital modulators 202 mix the baseband signals with digital carrier signals generated by the NCOs 204. Interpolators 203 increase the sample rate of the baseband signals to match the sample rate of the digital carrier signals generated by the NCOs 204. In the example, the in-phase interpolators 203I interpolate the I baseband signals and the quadrature phase interpolators 203Q interpolate the Q baseband signals. Each NCO 204 generates a pair of digital carrier signals each comprising a discrete time, discrete-amplitude sinusoid having a particular carrier frequency. In various configurations, the carrier frequency can be an intermediate frequency (IF) frequency or an RF frequency. The pair of digital carrier signals are in quadrature with each other (e.g., 90 degrees out of phase).

The digital modulators 202 generate modulated signals from the baseband signals output by the interpolators 203 and the digital carrier signals output by the NCOs 204. In general, the digital modulators 202 modulate the digital carrier signals with the baseband signals to generate the modulated signals. The modulated signals each include a carrier frequency shifted from a baseband frequency (sample rate of the baseband signals). In one configuration, the carrier frequency of each of the modulated signals is an RF frequency. This supports a direct-RF transmitter architecture where the baseband signals directly modulate RF carriers. In such a configuration, the NCOs 204 output digital carrier signals having selected RF frequencies.

In another configuration, the carrier frequency of each of the modulated signals is an IF frequency. This supports IF to RF transmitter architectures where the the baseband signals modulate IF carriers, and then the IF carriers are upconverted to RF carriers. In such a configuration, the NCOs 204 output digital carrier signals having selected IF frequencies.

In one configuration, each of the digital modulators 202 outputs one modulated signal via a single output. The modulated signal is a sum of an in-phase digital carrier signal modulated by an I baseband signal and a quadrature-phase digital carrier modulated by a Q baseband signal. In such case, both the amplitude and phase of the modulated signal are modulated by the pair of I and Q baseband signals. Of course, if the Q baseband signal is always zero (e.g., an in-phase modulation scheme, such as ASK, is employed), then the modulated signal is the in-phase digital carrier modulated by the I baseband signal. The carrier frequency can be either an IF frequency or an RF frequency.

In another configuration, each of the digital modulators 202 outputs two modulated signals via two outputs. That is, each of the digital modulators 202 includes I and Q outputs providing I and Q modulated signals. The I modulated signal comprises an I digital carrier signal modulated by an I baseband signal, and the Q modulated signal comprises a Q digital carrier signal modulate by a Q baseband signal. The carrier frequency is an IF frequency. In another configuration, the digital modulators 202 may be bypassed, allowing the interpolated I and Q baseband signals to be passed directly to the interface circuits 206. Thus, the transmitter 104 supports both real IF/RF and complex IF transmitter architectures. The configuration of the first circuit stage 250 can be controlled by the controller 112.

The second circuit stage 252 includes digital-to-analog converters (DACs) 208, filters 209, and power amplifiers (PAs) 214. In the present example, the second circuit stage 252 includes N DACs $208_1$ through $208_N$, N filters $209_1$ through $209_N$, and N PAs $214_1$ through $214_N$. Inputs of the DACs 208 are coupled to outputs of the interface circuits 206. Outputs of the DACs 208 are coupled to inputs of the filters 209. Outputs of the filters 209 are coupled to inputs of the PAs 214. Outputs of the PAs 214 are coupled to the antennas 110. In some examples, the second circuit stage 252 also includes analog modulator(s) 210, filter(s) 212, and PA(s) 216. Inputs of the analog modulator(s) 210 are coupled to outputs of filters 209. Output(s) of the analog modulator(s) 210 are coupled to inputs of the filter(s) 212. Output(s) of the filters 212 are coupled to input(s) of the PA(s) 216. Output(s) of the PAs 216 are coupled to antennas 110.

The second circuit stage 252 implements the transmit path(s) 114. In various configurations, some transmit paths 114A each include a DAC 208, a filter 209, and a PA 214. For example, the second circuit stage 252 can be configured to include N transmit paths 114A. Other output paths 114B each include a DAC 208, a filter 209, an analog modulator 210, a filter 212, and a PA 216. The second circuit stage 252 can be configured to include N or less output paths 114B. For example, second circuit stage 252 can be configured to include N/2 output paths 114B. The analog modulator(s) 210, the PAs 214, and the PA(s) 216 can be selectively enabled through control signals output by the controller 112. Thus, second circuit stage 252 can include different configurations of transmit paths 114 depending on the mode of the transmitter 104.

The interface circuits 206 couple the modulated signals output by the first circuit stage 250 to one or more transmit paths 114 implemented in the second circuit stage 252 depending on a mode selected by the controller 112. As shown in examples below, interface circuits 206 can include adders and multiplexers that are configurable to route the modulated signals among the transmit path(s) 114 based on a selected mode. In one mode ("single-band mode"), the interface circuits 206 are configured to couple N modulated signals generated by the first circuit stage to a respective N transmit paths 114 implemented in second circuit stage 252. For example, if the modulated signals include RF carrier frequencies, the interface circuits 206 are configured to couple N modulated signals to N transmit paths 114A (e.g., a single-band direct-RF architecture). If the signals include IF carrier frequencies, the interface circuits 206 are configured to couple N modulated signals to N transmit paths 114B (e.g. a single-band real-IF architecture). In such an example, the analog modulators 210 function to upconvert the IF signals to RF signals for radiation by antennas 110. Only a single input of each analog modulator 210 is used.

In another mode ("multi-band mode"), the interface circuits 206 are configured to combine modulated signals and couple the combined modulated signals to transmit path(s) 114 implemented by the second circuit stage 252. That is, in a multi-band mode, the interface circuits 206 are configured to couple a sum(s) of at least two of the modulated signals output by the first circuit stage 250 to respective transmit path(s) 114, where the at least two modulated signals forming each sum have different carrier frequencies. Example multi-band modes for the transmitter 104 are described below. The configuration of interface circuits 206 is set by controller 112 based on the selected mode of the transmitter 104.

Figure 3:
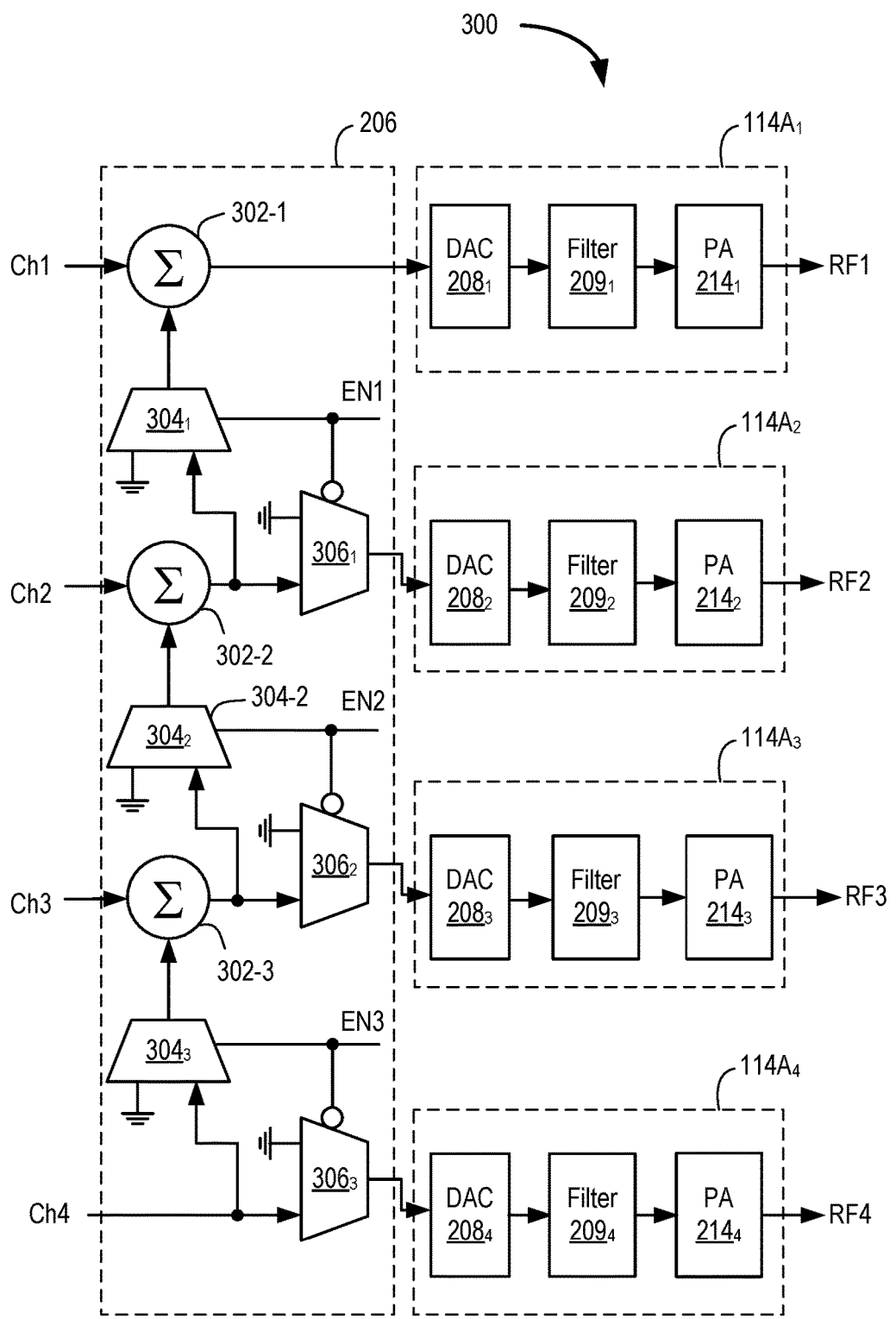
FIG. 3 is a block diagram illustrating a configuration of the transmitter of FIG. 2 according to an example.

FIG. 3 is a block diagram illustrating a configuration 300 of the transmitter 104 according to an example. In the present example, the interface circuits 206 include adders $302_1$ through $302_3$ (collectively "adders 302"), multiplexers $304_1$ through $304_3$ (collectively "multiplexers 304"), and multiplexers $306_1$ through $306_3$ (collectively "multiplexers 306"). Each of the multiplexers 304 and 306 include two inputs and one output. Each of the adders 302 includes two inputs and one output.

In the present example, the interface circuits 206 receive outputs from four digital modulators $202_1$ through $202_4$ and provide output to four DACs $208_1$ through $208_4$ (e.g., N=4 in FIG. 2). First inputs of the multiplexers 304 and 306 are each coupled to a reference voltage (e.g., electrical ground). First inputs of the adders $302_1$ through $302_3$ are configured to receive modulated signals from the digital modulators $202_1$ through $202_3$, respectively (designated channels (Ch) 1-3). An output of the adder $302_1$ is coupled to an input of the DAC $208_1$, while outputs of the adders $302_2$ and $302_3$ are coupled to second inputs of the multiplexers $306_1$ and $306_2$, respectively. Second inputs of the adders $302_1$ through $302_3$ are coupled to outputs of the multiplexers $304_1$ through $304_3$, respectively. Second inputs of the multiplexers $304_1$ and $304_2$ are coupled to outputs of the adders $302_2$ and $302_3$, respectively. A second input of the multiplexer $306_3$ is coupled to an output of a digital modulator $202_4$ (designated Ch. 4). A second input of the multiplexer $304_3$ is also coupled to the output of the digital modulator $202_4$. Control inputs of the multiplexers $304_1$ through $304_3$, and the multiplexers $306_1$ through $306_3$, receive enable signals EN1 through EN3, respectively, from the controller 112. The control inputs of the multiplexers $306_1$ through $306_3$ invert the enable signals EN1 through EN3.

The second circuit stage 252 includes transmit paths $114A_1$ through $114A_4$. Each of the transmit paths 114A includes a DAC 208, a filter 209, and a PA 214. For each transmit path 114A, the DAC 208 converts a digital modulated signal to an analog signal. The filter 209 removes image(s) from the analog signal (e.g., a DAC image). The PA 214 increases the power of the analog signal for radiation by an antenna 110. The transmit paths $114A_1$ through $114A_4$ output RF analog signals RF1 through RF4.

In operation, each of the channels 1-4 is a modulated signal having a particular carrier frequency shifted from baseband frequency. The modulated signals on channels 1-4 can include carrier frequencies F1-F4. In the present example, the carrier frequencies F1-F4 comprise different RF frequencies. Each of the enable signals EN1 through EN3 is a two-state signal indicating either logic "1" or logic "0". When the control inputs of the multiplexers 304 and 306 receive a logic "0", the multiplexers 304 and 306 select the first inputs. When the control inputs of the multiplexers 304 and 306 receive a logic "1", the multiplexers 304 and 306 select the second inputs.

In a first mode (single-band mode), the enable signals EN1 through EN3 are logic "0". Thus, in the single-band mode, the multiplexers $304_1$ through $304_3$ select the first inputs (e.g., the reference voltage) and the channels 1 through 3 pass through the adders $302_1$ through $302_3$. In the single-band mode, the multiplexers $306_1$ through $306_3$ select the second inputs, which are the outputs of the adders $302_2$ through $302_3$. As such, the DACs $208_1$ through $208_4$ receive as input the channels 1 through 4, respectively. The signals RF1 through RF4 include carrier frequencies F1 through F4, respectively.

In another mode (a multi-band mode), the enable signals EN1 through EN3 are logic "1". In such a multi-band mode, the multiplexers $304_1$ through $304_3$ select the second inputs (e.g., the outputs of the adders $302_2$ through $302_3$ and Ch4, respectively). As such, Ch4 is added to Ch3, the sum of Ch3 and Ch4 is added to Ch2, and the sum of Ch2-Ch4 is added to Ch1. The output of the adder $302_1$ provides the sum of all of Ch1 through Ch4 to the input of the DAC $208_1$. In this multi-band mode, the signal RF1 includes four frequency bands having the carrier frequencies F1 through F4.

Other multi-band modes are possible. For example, if EN1 and EN3 are logic "1" and EN 2 is logic "0", then Ch1 and Ch2 are summed and Ch3 and Ch4 are summed. The signal RF1 includes two frequency bands with carrier frequencies of F1 and F2, and the signal RF2 includes two frequency bands with carrier frequencies of F3 and F4. In another example, the enable signals EN1 and EN2 are logic "1" and EN3 is logic "0". In such an example, the signal RF1 includes three frequency bands with carrier frequencies of F1-F3, and the signal RF4 includes a single frequency band with a carrier frequency of F4. The interface circuits 206 can support more or less than four channels.

Figure 4:
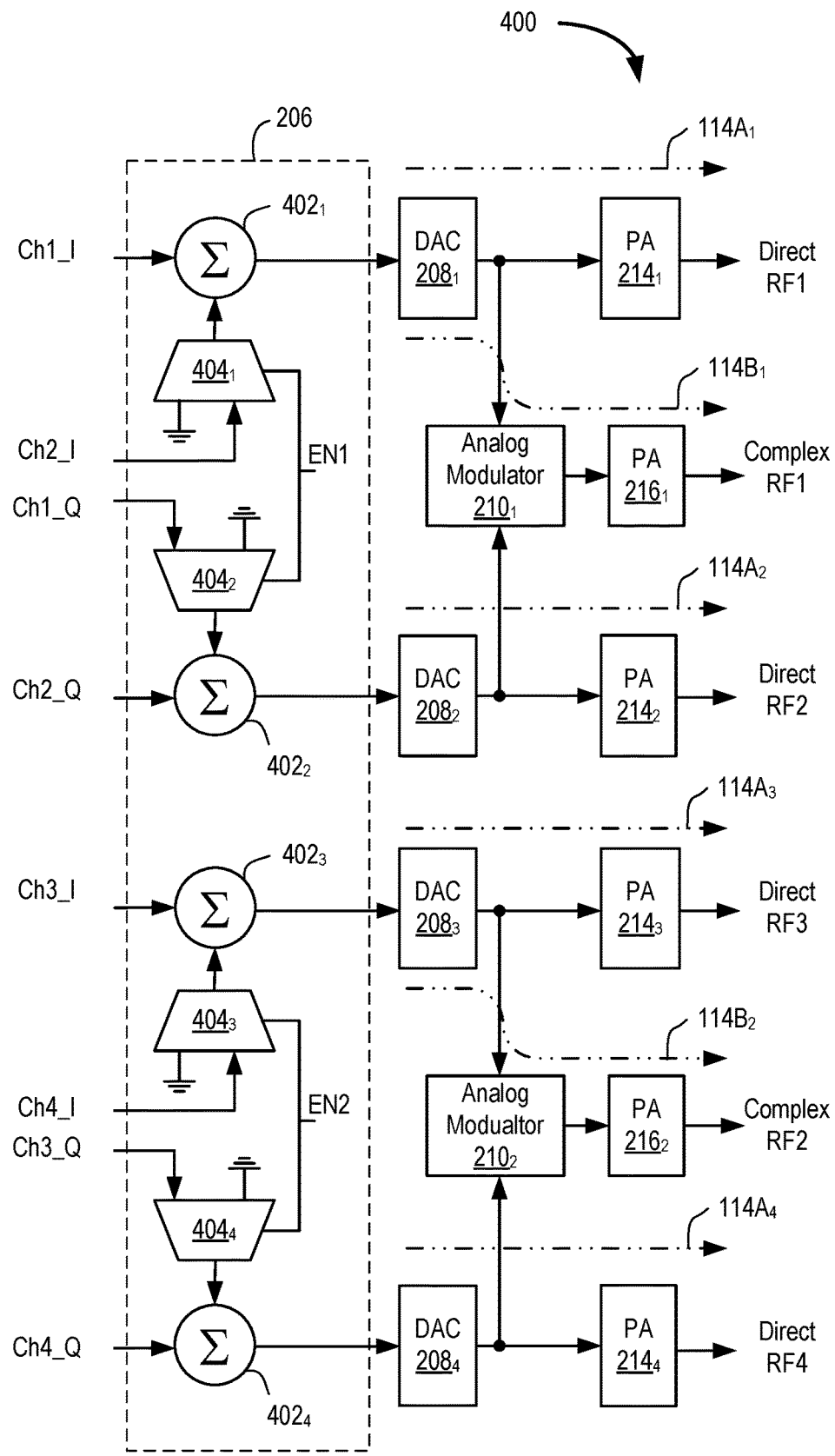
FIG. 4 is a block diagram illustrating another configuration of the transmitter of FIG. 2 according to an example.

FIG. 4 is a block diagram illustrating another configuration 400 of the transmitter 104 according to another example. In the present example, the interface circuits 206 include adders $402_1$ through $402_4$ (collectively adders 402) and multiplexers $404_1$ through $404_4$ (collectively multiplexers 404). Each of the multiplexers 404 include two inputs and one output. Each of the adders 402 includes two inputs and one output.

A first input of the adder $402_1$ is coupled to in-phase output of the digital modulator $202_1$ (designated Ch1_I) and a second input of the adder $402_1$ is coupled to an output of the multiplexer $404_1$. A first input of the adder $402_2$ is coupled to a quadrature-phase output of the digital modulator $202_1$ (designated Ch2_Q) and a second input of the adder $402_2$ is coupled to an output of the multiplexer $404_2$. First inputs of the multiplexers $404_1$ and $404_2$ are coupled to a reference voltage (e.g., electrical ground). A second input of the multiplexer $404_1$ is coupled to in-phase output of the digital modulator $202_2$ (designated Ch2_I). A second input of the multiplexer $404_2$ is coupled to quadrature-phase output of the digital modulator $202_1$ (designated Ch1_Q). Control inputs of the multiplexers $404_1$ and $404_2$ are coupled to a control signal EN1 provided by the controller 112. Outputs of the adders $402_1$ and $402_2$ are coupled to the inputs of DACs $208_1$ and $208_2$, respectively.

A first input of the adder $402_3$ is coupled to in-phase output of the digital modulator $202_3$ (designated Ch3_I) and a second input of the adder $402_3$ is coupled to an output of the multiplexer $404_3$. A first input of the adder $402_4$ is coupled to a quadrature-phase output of the digital modulator $202_4$ (designated Ch4_Q) and a second input of the adder $402_4$ is coupled to an output of the multiplexer $404_4$. First inputs of the multiplexers $404_3$ and $404_4$ are coupled to a reference voltage (e.g., electrical ground). A second input of the multiplexer $404_3$ is coupled to in-phase output of the digital modulator $202_4$ (designated Ch4_I). A second input of the multiplexer $404_4$ is coupled to quadrature-phase output of the digital modulator $202_3$ (designated Ch3_Q). Control inputs of the multiplexers $404_3$ and $404_4$ is coupled to a control signal EN2 provided by the controller 112. Outputs of the adders $402_3$ and $402_4$ are coupled to the inputs of DACs $208_3$ and $208_4$, respectively.

In the present example, outputs of the DACs $208_1$ and $208_2$ are coupled to in-phase and quadrature-phase inputs of the analog modulator $210_1$, respectively. Outputs of the DACs $208_3$ and $208_4$ are coupled to in-phase and quadrature-phase inputs of the analog modulator $210_2$, respectively. Filters 209 and 212 are omitted for clarity, but are disposed between DACs 208 and PAs 214 and between analog modulators 210 and PAs 216, as shown in FIG. 2.

Each of the enable signals EN1 and EN2 is a two-state signal indicating either logic "1" or logic "0". When the control inputs of the multiplexers 404 receive a logic "0", the multiplexers 404 select the first inputs. When the control inputs of the multiplexers 404 receive a logic "1", the multiplexers 404 select the second inputs. In a first mode (single-band mode), the enable signals EN1 and EN2 are logic "0". In the single-band mode, each adder 402 passes its input signal to a respective DAC 208. The signals at the first inputs of the adders 402 (i.e., Ch1_I, Ch2_Q, Ch3_I, and Ch4_Q) can be modulated signals each comprising a different RF frequency band. The outputs of the PAs $214_1$ through $214_4$ provide RF signals Direct RF1 through Direct RF4, respectively. The signals Direct RF1 through Direct RF4 include frequency bands having carrier frequencies F1 through F4, respectively. Thus, in the single-band mode, the transmitter 104 includes four single-band direct-RF output paths $114A_1$ through $114A_4$. In the single-band mode, the controller 112 can disable the analog modulators 210 and the PAs 216.

In another mode (a multi-band mode), the enable signals EN1 and EN2 are logic "1". In such a multi-band mode, the multiplexers 404 select the second inputs. As such, the output of the adder $402_1$ is the sum of Ch1_I and Ch2_I; the output of the adder $402_2$ is the sum of Ch1_Q and Ch2_Q; the output of the adder $402_3$ is the sum of Ch3_I and Ch4_I; and the output of the adder $402_4$ is the sum of Ch3_Q and Ch4_Q. Each of the signals Ch1_I through Ch4_I and Ch1_Q through Ch4_Q4 can be a modulated signal comprising an IF carrier frequency (e.g., IF1 through IF4 for channels 1 through 4). The in-phase channels Ch1_I through Ch4_I include in-phase modulated signals, and the quadrature-phase channels Ch1_Q through Ch4_Q include quadrature-phase modulated signals. The DAC $208_1$ outputs a multi-band in-phase analog signal to the in-phase input of the analog modulator $210_1$ (having IF carrier frequencies IF1 and IF2), and the DAC $208_2$ outputs a multi-band quadrature-phase analog signal to the quadrature-phase input of the analog modulator $210_1$ (having IF frequencies IF1 and IF2). The analog modulator $210_1$ upconverts and sums the multi-band in-phase and quadrature-phase analog signals and the PA $216_1$ outputs an RF analog signal (Complex RF1). The Complex RF1 signal includes a single RF carrier frequency modulated by in-phase and quadrature-phase signals each having multiple IF carrier frequencies.

The DAC $208_3$ outputs a multi-band in-phase analog signal to the in-phase input of the analog modulator $210_3$ (having IF frequencies IF3 and IF4), and the DAC $208_4$ outputs a multi-band quadrature-phase analog signal to the quadrature-phase input of the analog modulator $210_4$ (having IF frequencies IF3 and IF4). The analog modulator $210_2$ upconverts and sums the multi-band in-phase and quadrature-phase analog signals and the PA $216_2$ outputs an RF analog signal (Complex RF2). The Complex RF2 analog signal includes a single RF carrier frequency modulated by in-phase and quadrature-phase signals each having multiple IF carrier frequencies. Thus, in this multi-band mode, the transmitter 104 includes two transmit paths $114B_1$ and $114B_2$. In the multi-band mode, the controller 112 can disable the PAs $214_1$ through $214_4$.

The example of FIG. 4 illustrates 2 independent 2-band IQ transmitters. In another example, with another level of multiplexing and associated adders, the same circuit block can be configured as a single 4-band IQ transmitter.

Referring to FIG. 2, each of the first circuit stage 250 and the second circuit stage 252 can have a fixed structure as shown. The interface circuits 206 can have a fixed structure, such as the structure shown in FIG. 3 or the structure shown in FIG. 4. In another example, the structure of interface circuits 206 can be configurable. The controller 112 can configure the interface circuits 206 to have either the structure shown in FIG. 3 or the structure shown in FIG. 4.

Figure 5:
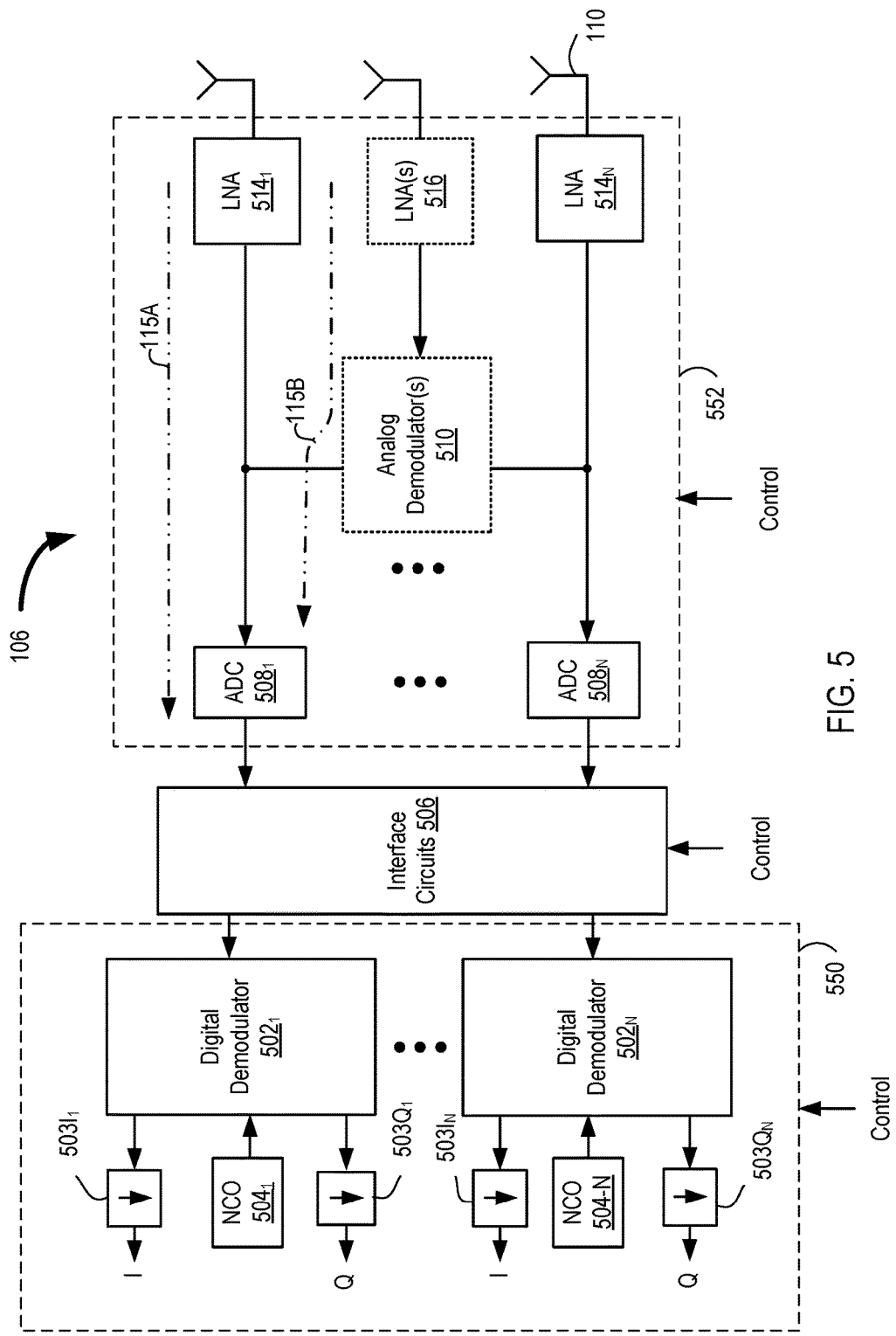
FIG. 5 is a block diagram depicting a receiver according to an example.

FIG. 5 is a block diagram depicting the receiver 106 according to an example. The receiver 106 includes a first circuit stage 552, interface circuits 506, and a second circuit stage 550. Inputs of the first circuit stage 552 receive RF energy from antennas 110. Outputs of the first circuit stage 552 are coupled to inputs of the interface circuits 506. The outputs of the first circuit stage 552 provide digital signals generated from the received RF energy. Outputs of the interface circuits 506 are coupled to inputs of the second circuit stage 550. The interface circuits 506 selectively couple the digital signals to the demodulator paths 116 implemented by the second circuit stage 550. Outputs of the second circuit stage 550 provide baseband signals.

The first stage circuit 552 includes analog-to-digital converters (ADCs) 508 and low-noise amplifiers (LNAs) 514. In the present example, the first circuit stage 552 includes N ADCs $508_1$ through $508_N$, and N LNAs $514_1$ through $514_N$. Inputs of the LNAs 514 are coupled to the antennas 110. Outputs of the LNAs 514 are coupled to inputs of the ADCs 508. Outputs of the ADCs 508 are coupled to inputs of the interface circuits 506. In some examples, the first circuit stage 552 also includes analog demodulator(s) 510 and LNA(s) 516. Input(s) of the LNA(s) 516 are coupled to the antenna(s) 110. Output(s) of the LNA(s) 516 are coupled to input(s) of the analog demodulator(s) 510. Outputs of each of the analog demodulator(s) 510 are coupled to inputs of ADCs 508.

The first stage circuit 552 implements the plurality of receive paths 115. In operation, some receive paths 115A include an ADC 508 and an LNA 514 coupled to an antenna 110. The bandwidth of a receive path 115A includes at least one RF frequency band being received. For example, the first stage circuit 552 can include N receive paths 115A. Other receive paths 115B include an LNA 514, an analog demodulator 510, and an ADC 508. The bandwidth of a receive path 115B includes at least one RF frequency band being received. The first stage circuit 552 can include N or less receive paths 115B. For example, the first circuit stage 552 can include N/2 receive paths 115B. The analog demodulators 510, the LNAs 514/516, and the ADCs 508 can be selectively enabled through control signals output by the controller 112. Thus, the first circuit stage 552 can include different configurations of the receive paths 115 depending on the mode of the receiver 106.

The interface circuits 506 couple the digital signals output by the first circuit stage 552 to one or more demodulator paths 116 implemented in the second circuit stage 550 depending on a mode selected by the controller 112. As shown in examples below, interface circuits 506 can include multiplexers that are configurable to route the digital signals among the demodulator path(s) 116 based on a selected mode. In one mode ("single-band mode"), the interface circuits 506 are configured to couple N digital signals generated by the first circuit stage 552 to a respective N demodulator paths 116 implemented in second circuit stage 550. For example, each of the N receive paths 115 can include a bandwidth having a respective one of N RF frequency bands. Thus, each digital signal has a different RF frequency band. Each of the N demodulator paths 116 can process a different RF carrier frequency to recover the baseband signals (e.g., a single-band direct-RF architecture).

In another mode ("multi-band mode"), the interface circuits 506 are configured to couple each of one or more digital signals to multiple demodulator paths 116 implemented by the second circuit stage 550 each processing a different carrier frequency. That is, in a multi-band mode, the interface circuits 506 are configured to couple a given digital signal to at least two of the demodulator paths 116, where the at least two demodulator paths 116 process different carrier frequencies. Example multi-band modes for the receiver 106 are described below. The configuration of interface circuits 506 is set by controller 112 based on the selected mode of the receiver 106.

In an example, the second circuit stage 550 includes a plurality of digital demodulators 502, a plurality of decimators 503, and a plurality of NCOs 504. Inputs of the digital demodulators 502 are coupled to outputs of the interface circuits 506. Outputs of the digital demodulators 502 are coupled to inputs of the decimators 503. LO inputs of the digital demodulators 502 are coupled to outputs of the NCOs 504. Outputs of the decimators 503 provide baseband signals. In the example of FIG. 5, the second circuit stage 550 includes N digital demodulators $502_1$ through $502_N$, where N is an integer greater than one. Each of the demodulator paths 116 includes a respective one of the demodulators 502 (e.g., N demodulator paths 116). The decimators 503 include in-phase decimators $503I_1$ through $503I_N$ and quadrature-phase decimators $503Q_1$ through $503Q_N$. The decimators $503I_1$ and $503Q_1$ are coupled to the digital demodulator $503_1$ and the decimators $503I_N$ and $503Q_N$ are coupled to the digital demodulator $503_N$. The NCOs 504 include NCOs $504_1$ through $504_N$. Each of the NCOs $504_1$ through $504_N$ is coupled to a respective one of the digital demodulators $502_1$ through $502_N$.

In operation, the receive paths 115 generate digital signals from the received RF energy. Each of the digital demodulators 502 demodulates a different carrier frequency. The digital demodulators 502 can perform in-phase or quadrature demodulation depending on the particular digital modulation scheme employed. The NCOs 204 generate LO signals each having a selected carrier frequency. The selected carrier frequency can be an RF frequency or IF frequency depending on the receiver configuration. The decimators 503 reduce the sample rate of the baseband signals output by the digital demodulators 502. The receiver 106 supports both real IF/RF and complex IF receiver architectures. The configuration of the first circuit stage 552 can be controlled by the controller 112.

Figure 6:
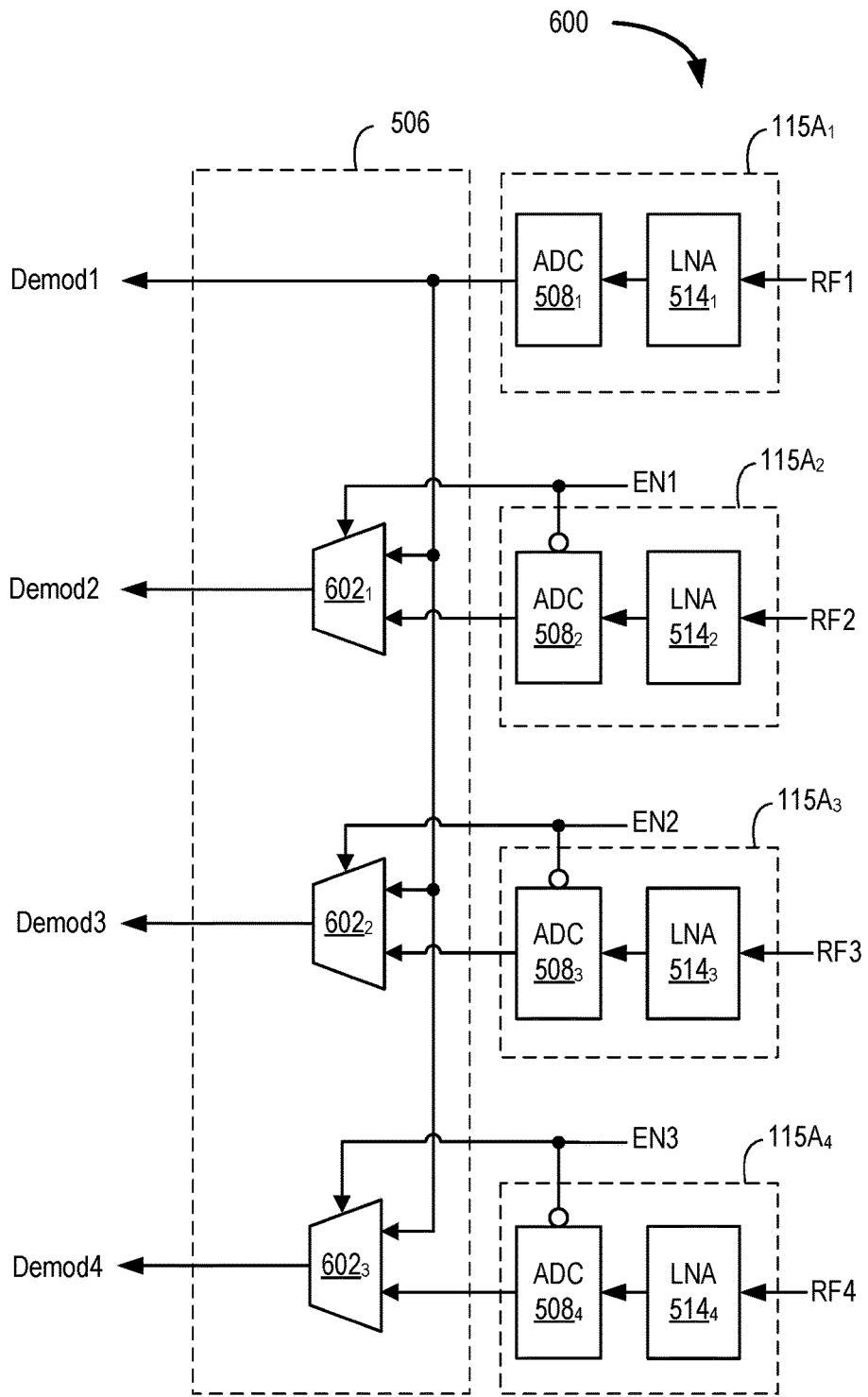
FIG. 6 is a block diagram illustrating a configuration of the receiver of FIG. 5 according to an example.

FIG. 6 is a block diagram illustrating a configuration 600 of the receiver 106 according to an example. In the example, the interface circuits 506 include multiplexers $602_1$ through $602_3$ (collectively multiplexers 602). Receive paths $115A_1$ through $115A_4$ include LNAs $514_1$ through $514_4$ and ADCs $508_1$ through $508_4$ (e.g., N=4). First inputs of the multiplexers $602_1$ through $602_3$ are coupled to outputs of the ADCs $508_2$ through $508_4$, respectively. Second inputs of the multiplexers 602 are coupled to the output of ADC $508_1$. Control inputs of the multiplexers $602_1$ through $602_3$ receive enable signals EN1 through EN3, which are provided by the controller 112. An output of the ADC $508_1$ provides a digital signal for a first demodulator (demod1). Outputs of the multiplexers $602_1$ through $602_3$ provide digital signals for second, third, and fourth demodulators (demod2, demod3, and demod4).

In operation, when EN1 through EN3 are at logic "0", the multiplexers 602 select the first inputs. The enable signals EN1 through EN3 are set to logic "0" in the single-band mode. In the single-band mode, a digital signal is provided to the first demodulator for processing the carrier frequency of RF1, a digital signal is provided to the second demodulator for processing the carrier frequency of RF2, a digital signal is provided to the third demodulator for processing the carrier frequency of RF3, and a digital signal is provided to the fourth demodulator for processing the carrier frequency RF4. Each of the receive paths 115A has a bandwidth that includes a respective one of the RF frequency bands of RF1-RF4.

When EN1 through EN3 are set to logic "1", the multiplexers 602 select the second inputs (e.g., the output of the ADC $508_1$). The enable signals EN1 through EN3 are set to logic "1" in the multi-band mode. In the multi-band mode, the digital signal output by the receive path $115A_1$ is coupled to each of the first through fourth demodulators, each of which processes a different carrier RF frequency of RF1 through RF4. The receive path $115A_1$ has a bandwidth that includes each of the RF frequency bands of RF1 through RF4. Other multi-band modes are possible (e.g., only EN1 is "1", EN1 and EN1 are "1" and EN 3 is "0"). Further, more complete multiplexing options can be provided. For example, multiplexing can be provided for two independent 2-band receivers, where demod1 and demod2 are driven by ADC $508_1$, while demod3 and demod4 are driven by ADC 508-3. In another example, a full cross-bar multiplexer can be used to provide full flexibility in what combination of source ADC receivers can drive the demodulator paths.

Figure 7:
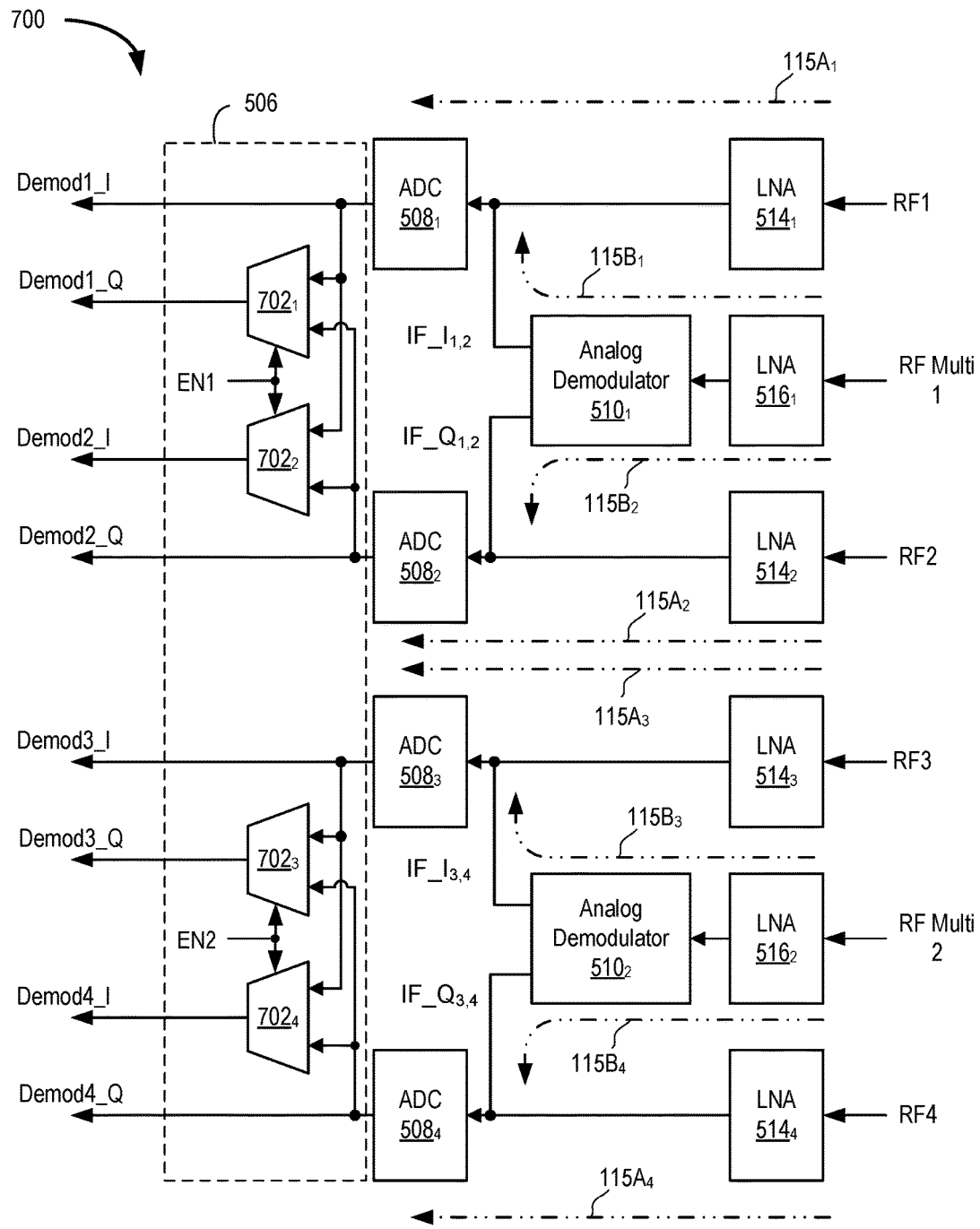
FIG. 7 is a block diagram illustrating another configuration of the receiver of FIG. 5 according to an example.

FIG. 7 is a block diagram illustrating a configuration 700 of the receiver 106 according to an example. In the example, the interface circuits 506 include multiplexers $702_1$ through $702_4$ (collectively multiplexers 702). The first circuit stage 552 includes ADCs $508_1$ through $508_4$, LNAs $514_1$ through $514_4$, analog demodulators $510_1$ and $510_2$, and LNAs $516_1$ and $516_2$. An output of the ADC $508_1$ provides a digital signal to an in-phase input of a first demodulator (demod1_). An output of the ADC $508_2$ provides a digital signal to a quadrature-phase input of a second demodulator (demod2_Q). A first input of the multiplexer $702_1$ is coupled to the output of the ADC $508_1$, and a second input of the multiplexer $702_1$ is coupled to the output of the ADC $508_2$. A first input of the multiplexer $702_2$ is coupled to the output of the ADC $508_2$, and a second input of the multiplexer $702_2$ is coupled to the output of the ADC $508_1$. An output of the multiplexer $702_1$ is coupled to a quadrature-phase input of the first demodulator (demod1_Q). An output of the multiplexer $702_2$ is coupled to an in-phase input of the second demodulator (demod2_I). Control inputs of the multiplexers $702_1$ and $702_2$ are coupled to receive an enable signal EN1 from the controller 112. As described in the examples above, in another example, a full cross-bar multiplexer allows for more combinations of ADC-to-demodulator couplings.

An output of the ADC $508_3$ provides a digital signal to an in-phase input of a third demodulator (demod3_I). An output of the ADC $508_4$ provides a digital signal to a quadrature-phase input of a fourth demodulator (demod4_Q). A first input of the multiplexer $702_3$ is coupled to the output of the ADC $508_3$, and a second input of the multiplexer $702_3$ is coupled to the output of the ADC $508_4$. A first input of the multiplexer $702_4$ is coupled to the output of the ADC $508_4$, and a second input of the multiplexer $702_4$ is coupled to the output of the ADC $508_3$. An output of the multiplexer $702_3$ is coupled to a quadrature-phase input of the third demodulator (demod3_Q). An output of the multiplexer $702_4$ is coupled to an in-phase input of the fourth demodulator (demod4_I). Control inputs of the multiplexers $702_3$ and $702_4$ are coupled to receive an enable signal EN2 from the controller 112.

In a first mode (single-band mode), the first circuit stage 552 is configured to provide receive paths $115A_1$ through $115A_4$. Each receive path 115A includes an LNA 514 and an ADC 508. In the single-band mode, the enable signals EN1 and EN2 are logic "0" and select the first inputs of the multiplexers 702. In such case, a digital signal output by each receive path 115A is coupled to both the I and Q inputs of a respective demodulator. Each receive path 115A has a bandwidth that includes a respective one of RF frequency bands RF1-RF4. Each of the demodulators demodulates a respective RF carrier frequency of RF frequency bands RF1-RF4. In the single-band mode, the controller 112 can disable the LNAs 516 and the analog demodulators 510.

In a second mode (multi-band mode), the first circuit stage 552 is configured to provide receive paths $115B_1$ through $115B_4$. Each receive path 115B includes an LNA 516, an analog demodulator 510, and an ADC 508. In the multi-band mode, the enable signals EN1 and EN2 are logic "1" and select the second inputs of the multiplexers 702. In such case, a digital signal output by each receive path 115B is coupled to inputs of two of the demodulators. In particular, the digital signal output by the receive path $115B_1$ is coupled to the in-phase inputs of the first and second demodulators (demod1_I and demod2_I). The digital signal output by the receive path $115B_2$ is coupled to the quadrature-phase inputs of the first and second demodulators (demod1_Q and demod2_Q). Likewise, the digital signal output by the receive path $115B_3$ is coupled to the in-phase inputs of the third and fourth demodulators (demod3_I and demod4_I), and the digital signal output by the receive path $115B_4$ is coupled to the quadrature-phase inputs of the third and fourth demodulators (demod3_Q and demod4_Q). The digital signal output by the receive path $115B_1$ includes an in-phase digital carrier signal (IF_$I_{1,2}$) having first and second IF frequency bands (e.g., IF carrier frequencies $IF_1$ and $IF_2$). The digital signal output by the receive path $115B_2$ includes a quadrature-phase carrier signal (IF_$Q_{1,2}$) having the first and second IF frequency bands. Likewise, the digital signal output by the receive path $115B_3$ includes an in-phase digital carrier signal (IF_$I_{3,4}$) having third and fourth IF frequency bands (e.g., IF carrier frequencies $IF_3$ and $IF_4$). The digital signal output by the receive path $115B_4$ includes a quadrature-phase carrier signal (IF_$Q_{3,4}$) having the third and fourth IF frequency bands. The analog demodulator $510_1$ generates the digital signal IF_$I_{1,2}$ by demodulating an in-phase RF carrier signal having an RF carrier frequency RF_multi1. The analog demodulator $510_1$ generates the digital signal IF_$Q_{1,2}$ by demodulating a quadrature-phase RF carrier signal having the RF carrier frequency RF_multi1. Likewise, the analog demodulator $510_2$ generates the digital signal IF_$I_{3,4}$ by demodulating an in-phase RF carrier signal having an RF carrier frequency RF_multi2. The analog demodulator $510_2$ generates the digital signal IF_$Q_{3,4}$ by demodulating a quadrature-phase RF carrier signal having the RF carrier frequency RF_multi2. In the multi-band mode, the LNAs 514 can be disabled.

Figure 8:
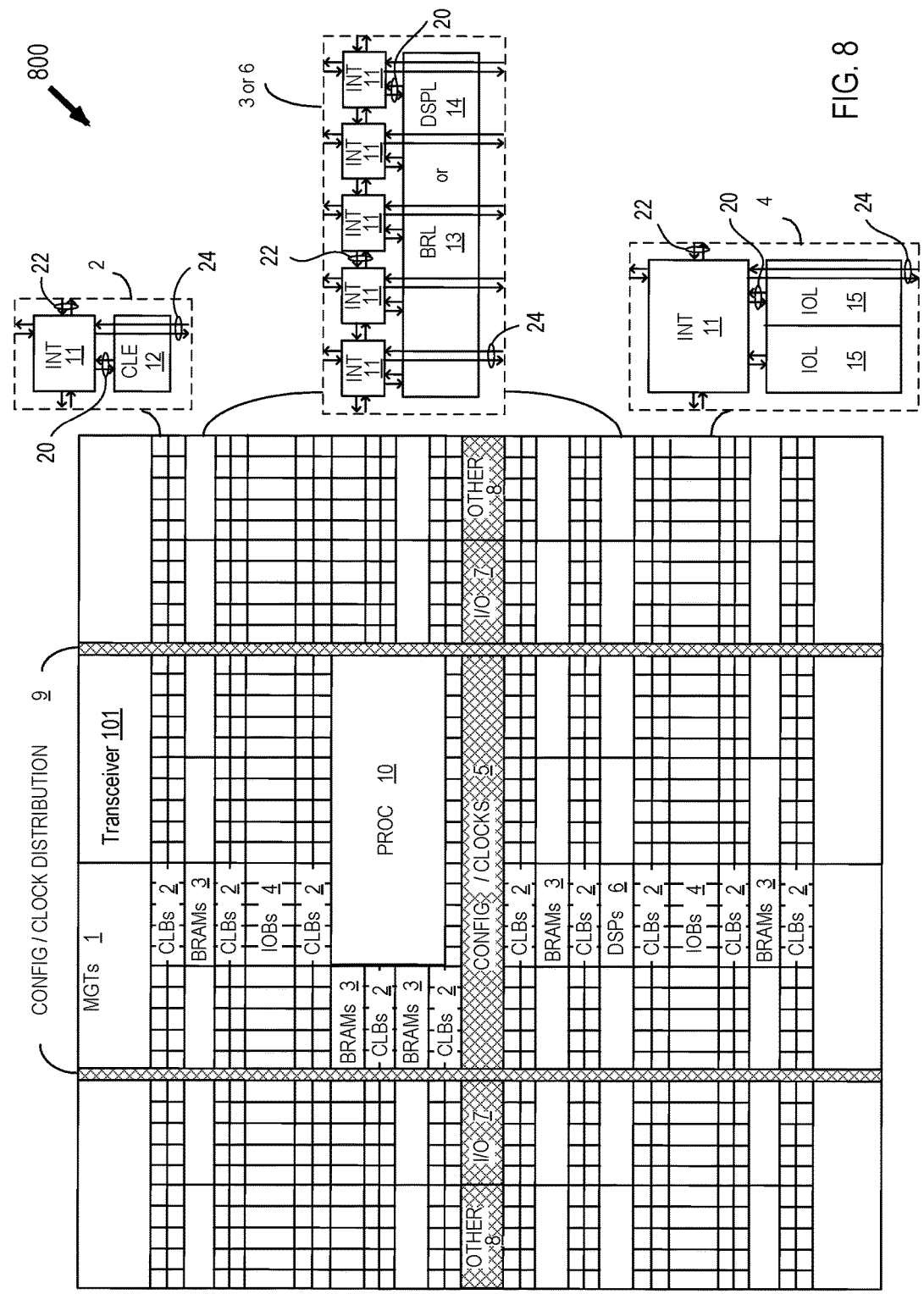
FIG. 8 illustrates an architecture of a field programmable gate array (FPGA).

The transceiver 101 described herein can be used in an IC, such as a field programmable gate array (FPGA) or other type of programmable IC or in an application specific integrated circuit (ASIC). Although an FPGA is shown by way of example, it is to be understood that the transceiver 101 can be implemented in other types of ICs or applications. FIG. 8 illustrates an architecture of an FPGA 800 that includes a large number of different programmable tiles including multi-gigabit transceivers ("MGTs") 1, configurable logic blocks ("CLBs") 2, random access memory blocks ("BRAMs") 3, input/output blocks ("IOBs") 4, configuration and clocking logic ("CONFIG/CLOCKS") 5, digital signal processing blocks ("DSPs") 6, specialized input/output blocks ("I/O") 7 (e.g., configuration ports and clock ports), and other programmable logic 8 such as digital clock managers, analog-to-digital converters, system monitoring logic, and so forth. Some FPGAs also include dedicated processor blocks ("PROC") 10.

In some FPGAs, each programmable tile can include at least one programmable interconnect element ("INT") 11 having connections to input and output terminals 20 of a programmable logic element within the same tile, as shown by examples included at the top of FIG. 8. Each programmable interconnect element 11 can also include connections to interconnect segments 22 of adjacent programmable interconnect element(s) in the same tile or other tile(s). Each programmable interconnect element 11 can also include connections to interconnect segments 24 of general routing resources between logic blocks (not shown). The general routing resources can include routing channels between logic blocks (not shown) comprising tracks of interconnect segments (e.g., interconnect segments 24) and switch blocks (not shown) for connecting interconnect segments. The interconnect segments of the general routing resources (e.g., interconnect segments 24) can span one or more logic blocks. The programmable interconnect elements 11 taken together with the general routing resources implement a programmable interconnect structure ("programmable interconnect") for the illustrated FPGA.

In an example implementation, a CLB 2 can include a configurable logic element ("CLE") 12 that can be programmed to implement user logic plus a single programmable interconnect element ("INT") 11. A BRAM 3 can include a BRAM logic element ("BRL") 13 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 6 can include a DSP logic element ("DSPL") 14 in addition to an appropriate number of programmable interconnect elements. An IOB 4 can include, for example, two instances of an input/output logic element ("IOL") 15 in addition to one instance of the programmable interconnect element 11. As will be clear to those of skill in the art, the actual I/O pads connected, for example, to the I/O logic element 15 typically are not confined to the area of the input/output logic element 15.

In the pictured example, a horizontal area near the center of the die (shown in FIG. 8) is used for configuration, clock, and other control logic. Vertical columns 9 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 10 spans several columns of CLBs and BRAMs. The processor block 10 can various components ranging from a single microprocessor to a complete programmable processing system of microprocessor(s), memory controllers, peripherals, and the like.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 9:
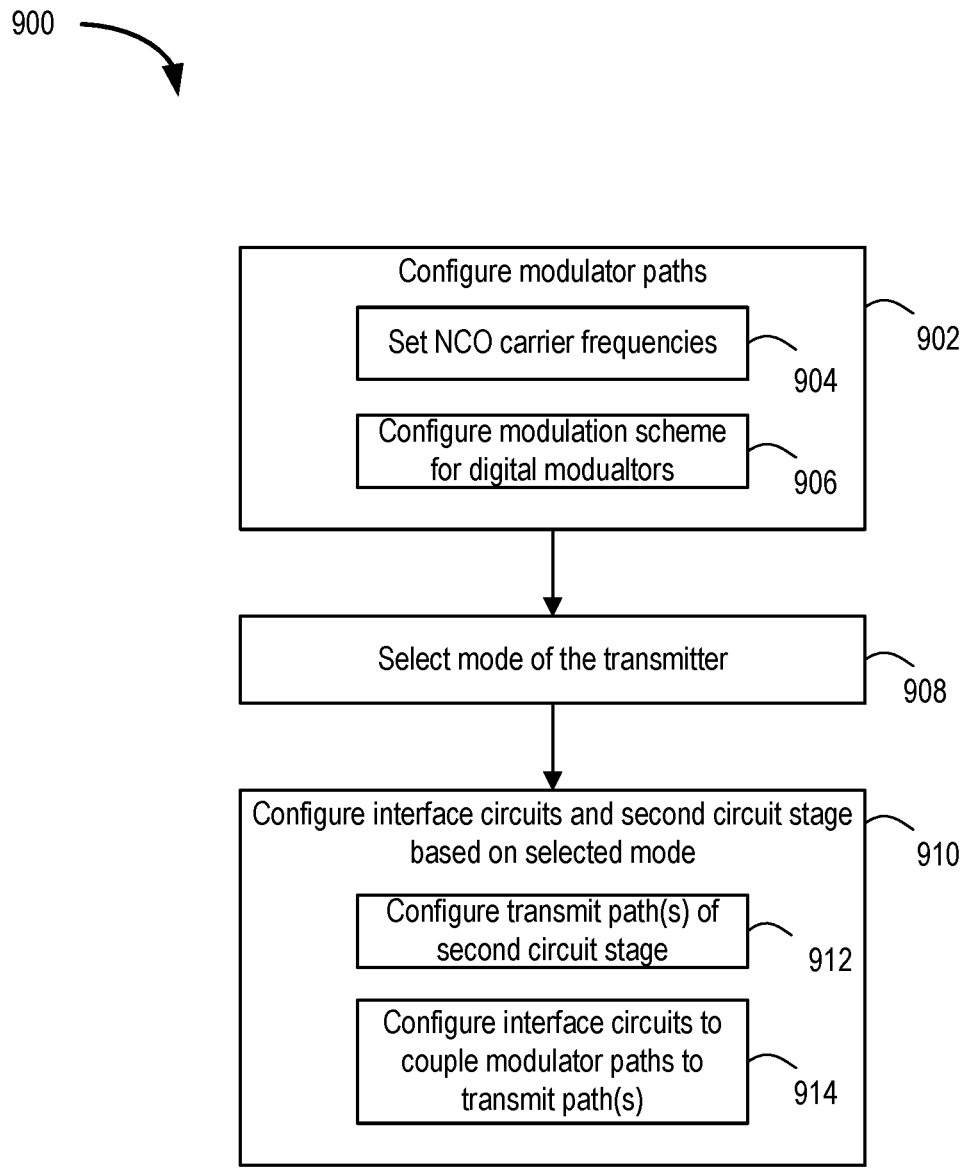
FIG. 9 is a flow diagram depicting a method of configuring a configurable single-band/multi-band transmitter according to an example.

FIG. 9 is a flow diagram depicting a method 900 of configuring a configurable single-band/multi-band transmitter according to an example. The method 900 can be performed by the communication system 100 to configure the transmitter 104. The method 900 begins at step 902, where the controller 112 configures the modulator paths 113 of the first circuit stage 250 of the transmitter 104. For example, at step 904, the controller 112 can set the carrier frequencies of the NCOs 204 in each modulator path 113. At step 906, the controller 112 can configure the digital modulators 202 to perform a particular digital modulation scheme (e.g., any type of quadrature modulation scheme or single-phase modulation scheme).

At step 908, the controller 112 selects a mode of the transmitter 104. The mode can be a single-band mode or one of a plurality of multi-band modes. At step 910, the controller 112 configures the interface circuits 206 and the second circuit stage 252 based on the selected mode. For example, at step 912, the controller 112 configures the second circuit stage 252 to have one or more transmit paths 114. The controller 112 can enable/disable components of the second circuit stage 252 to implement the transmit path(s) 114. For example, in single-band mode, the controller 112 can configure the second circuit stage 252 to have a plurality of transmit paths 114A each having a DAC 208, a filter 209, and a PA 214. In a multi-band mode, the controller 112 can configure the second circuit stage 252 to have one or more transmit paths 114B each having a DAC 208, a filter 209, an analog modulator 210, a filter 212, and a PA 216.

At step 914, the controller 112 configures the interface circuits 206 to couple the modulated signals output by the first circuit stage 250 to the configured transmit path(s) 114. For example, in single-band mode, the controller 112 can configure the interface circuits 206 to couple each modulated signal to a respective one of the plurality of transmit paths 114A. In a multi-band mode, the controller 112 can configure the interface circuits 206 to generate sum(s) of the modulated signal and to couple each sum to a respective one of the transmit path(s) 114B.

Figure 10:
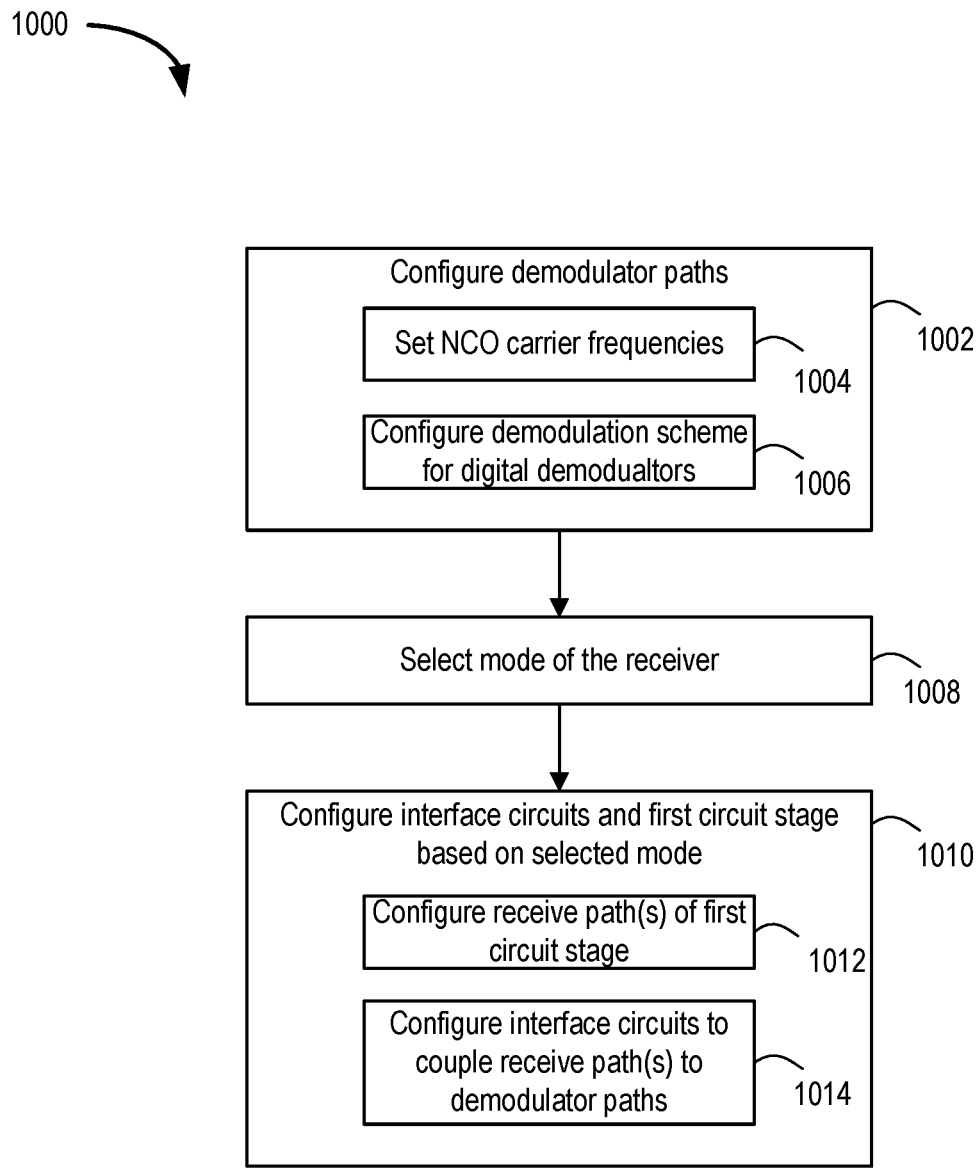
FIG. 10 is a flow diagram depicting a method of configuring a configurable single-band/multi-band receiver according to an example.

FIG. 10 is a flow diagram depicting a method 1000 of configuring a configurable single-band/multi-band receiver according to an example. The method 1000 can be performed by the communication system 100 to configure the receiver 106. The method 1000 begins at step 1002, where the controller 112 configures the demodulator paths 116 in the second stage circuit 550 of the receiver 106. For example, at step 1004, the controller 112 can set the carrier frequencies of the NCOs 504 in each demodulator path 116. At step 1006, the controller 112 can configure the digital demodulators 502 to perform a particular digital demodulation scheme (e.g., any type of quadrature demodulation scheme or single-phase demodulation scheme).

At step 1008, the controller 112 selects a mode of the receiver 106. The mode can be a single-band mode or one of a plurality of multi-band modes. At step 1010, the controller 112 configures the interface circuits 506 and the first circuit stage 552 based on the selected mode. For example, at step 1012, the controller 112 configures the first circuit stage 552 to have one or more receive paths 115. The controller 112 can enable/disable components of the first circuit stage 552 to implement the receive path(s) 115. For example, in single-band mode, the controller 112 can configure the first circuit stage 552 to have a plurality of receive paths 115A each having an LNA 514 and an ADC 508. In a multi-band mode, the controller 112 can configure the first circuit stage 552 to have one or more receive paths 115B each having an LNA 516, an analog demodulator 510, and an ADC 508.

At step 1014, the controller 112 configures the interface circuits 506 to couple the digital signals output by configured receive path(s) 115 of the first circuit stage 552 to the demodulator paths 116. For example, in single-band mode, the controller 112 can configure the interface circuits 506 to couple each digital signal from a plurality of receive paths 115A to a respective one of the plurality of demodulator paths 116. In a multi-band mode, the controller 112 can configure the interface circuits 506 to couple each digital signal from a plurality of receive paths 115B to at least two of the plurality of demodulator paths 116.

While the foregoing is directed to specific examples, other and further examples may be devised without departing from the basic scope thereof, and the scope thereof is determined by the claims that follow.

What is claimed is:

1. A transmitter, comprising:
  a first circuit stage configured to generate modulated signals from baseband signals, each of the modulated signals comprising a digital signal having respective a carrier frequency of a plurality of carrier frequencies;
  a second circuit stage configured to generate radio frequency (RF) energy to be radiated by one or more antennas; and
  interface circuits coupled between the first circuit stage and the second circuit stage; and
  a controller that configures a mode of the second circuit stage and the interface circuits selected from a first mode and a second mode, where:
  in the first mode, the second circuit stage provides a plurality of transmit paths and the interface circuits couple each of the modulated signals to a respective one of the plurality of transmit paths, wherein, in the first mode, each of the plurality of carrier frequencies comprises an RF frequency and each of the plurality of transmit paths includes a digital-to-analog converter (DAC) and a power amplifier (PA); and
  in the second mode, the second circuit stage provides a first transmit path and the interface circuits couple a sum of at least two of the modulated signals to the first transmit path.

2. The transmitter of claim 1, wherein, in the second mode, the second circuit stage provides a second transmit path and the interface circuits couple another sum of another at least two of the modulated signals to the second transmit path.

3. The transmitter of claim 1, wherein, in the second mode, the carrier frequencies of the at least two modulated signals comprise RF frequencies and the first transmit path includes a digital-to-analog converter (DAC) and a power amplifier (PA).

4. The transmitter of claim 1, wherein, in the second mode, the carrier frequencies of the at least two modulated signals comprise intermediate frequency (IF) frequencies and the first transmit path includes a digital-to-analog converter (DAC), an analog modulator, and a power amplifier (PA).

5. The transmitter of claim 1, wherein, in the second mode:
the at least two modulated signals comprise a first in-phase modulated signal having a first intermediate frequency (IF) and a second in-phase modulated signal having a second IF frequency; and
the second circuit stage provides a second transmit path and the interface circuits couple a sum of a first quadrature modulated signal and a second quadrature modulated signal to the second transmit path, the first quadrature modulated signal having the first IF frequency and the second quadrature modulated signal having the second IF frequency.

6. The transmitter of claim 5, wherein the first transmit path comprises a first digital-to-analog converter (DAC), an analog modulator, and a power amplifier (PA), and the second transmit path comprises a second DAC, the analog modulator, and the PA.

7. The transmitter of claim 1, wherein the first circuit stage comprises:
interpolators configured increase the sampling-rate of the baseband signals; and
digital modulators, coupled to the interpolators, configured to generate the modulated signals from the baseband signals.

8. The transmitter of claim 7, wherein the first circuit stage further comprises:
numerically controlled oscillators (NCOs), coupled to the digital modulators, configured to provide digital carrier signals for modulation by the baseband signals to generate the modulated signals.

9. The transmitter of claim 1, wherein the baseband signals comprise in-phase baseband signals and quadrature baseband signals, and wherein each of the modulated signals is a sum of an in-phase digital carrier signal modulated by one of the in-phase baseband signals and a quadrature digital carrier signal modulated by one of the quadrature baseband signals.

10. A receiver, comprising:
a first circuit stage configured to receive radio frequency (RF) energy from one or more antennas;
a second circuit stage having a plurality of demodulation paths each comprising a digital demodulator configured to process a respective frequency of a plurality of frequencies; and
interface circuits coupled between the first circuit stage and the second circuit stage; and
a controller that configures a mode of the second circuit stage and the interface circuits selected from a first mode and a second mode, where;
in the first mode, the first circuit stage generates a plurality of digital signals from the RF energy and the interface circuits couple each of the plurality of digital signals to a respective one of the plurality of demodulation paths; and
in the second mode, the first circuit stage generates a first digital signal from the RF energy and the interface circuits couple the first digital signal to at least two of the plurality of demodulation paths.

11. The receiver of claim 10, wherein, in the second mode, the first circuit stage generates a second digital signal from the RF energy and the interface circuits couple the second digital signal to at least two other of the plurality of demodulation paths.

12. The receiver of claim 10, wherein, in the second mode, the first circuit stage generates a second digital signal from the RF energy and the interface circuits couple the second digital signal to the at least two demodulation paths receiving the first digital signal.

13. The receiver of claim 12, wherein, in the second mode:
the at least two demodulation paths comprise a first demodulation path having a first digital demodulator and a second demodulation path having a second digital demodulator;
the first digital demodulator processes a first frequency of the plurality of frequencies and the second digital demodulator processes a second frequency of the plurality of frequencies; and
each of the first and second digital demodulators include in-phase (I) and quadrature (Q) inputs configured to receive the first digital signal and the second digital signal, respectively.

14. The receiver of claim 13, wherein the first frequency is a first intermediate frequency (IF) frequency and the second frequency is a second IF frequency and wherein, in the second mode, the first circuit stage provides:
a first receive path configured to generate an in-phase IF signal from the RF energy and the first digital signal from the in-phase IF signal; and
a second receive path configured to generate a quadrature IF signal from the RF energy and the second digital signal from the quadrature IF signal.

15. The receiver of claim 14, wherein the first receive path includes a low-noise amplifier (LNA), an analog demodulator, and a first analog-to-digital converter (ADC), and wherein the second receive path includes the LNA, the analog demodulator, and a second ADC.

16. The receiver of claim 10, wherein, in the first mode:
the plurality of demodulation paths comprises a first demodulation path having a first digital demodulator;
the first digital demodulator processes a first frequency of the plurality of frequencies;
the first digital demodulator includes in-phase (I) and quadrature (Q) inputs; and
in the first mode, the interface circuits couple one of the plurality of digital signals to both of the I and Q inputs of the first digital demodulator.

17. The receiver of claim 10, wherein the first frequency is a first RF frequency and wherein, in the first mode, the first circuit stage provides a first receive path configured to generate the one of the plurality of digital signals from the RF energy.

18. The receiver of claim 17, wherein the first receive path includes a low-noise amplifier (LNA) and an analog-to-digital converter (ADC).

19. The receiver of claim 10, wherein, in the second mode:

the first circuit stage provides a first receive path configured to generate the first digital signal;
the first receive path includes a low-noise amplifier (LNA) and an analog-to-digital converter (ADC).

* * * * *